United States Patent [19]

Umemoto et al.

[11] Patent Number: 5,111,499
[45] Date of Patent: May 5, 1992

[54] CORDLESS TELEPHONE APPARATUS HAVING A RINGER CIRCUIT OPERABLE DURING POWER FAILURE

[75] Inventors: Yuji Umemoto; Akio Toki; Shuji Yamaguchi, all of Hino, Japan

[73] Assignee: Kabushiki Kaisha Toshiba, Kawasaki, Japan

[21] Appl. No.: 555,800

[22] Filed: Jul. 23, 1990

Related U.S. Application Data

[63] Continuation of Ser. No. 100,323, Sep. 23, 1987, abandoned.

[30] Foreign Application Priority Data

Sep. 26, 1986 [JP] Japan ................. 61-225817

[51] Int. Cl.⁵ ............................................ H04M 11/02
[52] U.S. Cl. ................................ 379/61; 379/63; 379/413
[58] Field of Search ...................... 379/58, 61–63, 379/413

[56] References Cited

U.S. PATENT DOCUMENTS

| | | | |
|---|---|---|---|
| 4,400,584 | 8/1983 | Vilmur | 379/61 |
| 4,509,201 | 4/1985 | Sekigawa et al. | 379/61 |
| 4,562,307 | 12/1985 | Bursztejn et al. | 379/61 |
| 4,574,164 | 3/1986 | Orikasa | 379/63 |
| 4,591,661 | 5/1986 | Benedetto et al. | 379/61 |
| 4,595,795 | 6/1986 | Endo . | |
| 4,640,987 | 2/1987 | Tsukada | 379/62 |
| 4,650,931 | 3/1987 | Tsukada et al. | 379/61 |
| 4,677,655 | 6/1987 | Hashimoto | 379/61 |
| 4,706,274 | 11/1987 | Baker et al. | 379/61 |
| 4,728,933 | 3/1989 | Mazza | 340/388 |
| 4,731,814 | 3/1988 | Becker et al. | 379/62 |
| 4,788,712 | 11/1988 | Umemoto et al. | 379/63 |
| 4,839,918 | 6/1989 | Hata | 379/61 |

FOREIGN PATENT DOCUMENTS

| | | |
|---|---|---|
| 59-55344 | 10/1985 | Japan . |
| 0199242 | 10/1985 | Japan . |
| 59-68752 | 11/1985 | Japan . |
| 0235539 | 11/1985 | Japan ................................ 379/63 |
| 0024335 | 2/1986 | Japan ................................ 379/63 |
| 2159373 | 11/1985 | United Kingdom . |

OTHER PUBLICATIONS

Japanese Patent Abstract Publication, Document No. 0229539, Nov. 14, 1985, Yamagata.
Japanese Patent Abstract Publication, Document No. 0018302, Feb. 20, 1978, Ikoma.
U.S. patent application Ser. No. 07/102,342 filed on Sep. 29, 1987.

Primary Examiner—James L. Dwyer
Assistant Examiner—Dwayne D. Bost
Attorney, Agent, or Firm—Finnegan, Henderson, Farabow, Garrett and Dunner

[57] ABSTRACT

A cordless telephone apparatus adapted to produce a ringer tone from a connection device during power stoppage. The ringer circuit is rendered inoperative when the connection device and cordless telephone are connected via a radio circuit in response to an incoming call from a subscriber's line, and rendered operative in at least one of the two cases in which the connection device and the cordless telephone are not connected via the radio circuit in response to an incoming call from the subscriber's line and in which the power source stops supplying power..

5 Claims, 5 Drawing Sheets

CORDLESS TELEPHONE APPARATUS HAVING A RINGER CIRCUIT OPERABLE DURING POWER FAILURE

This application is a continuation of application Ser. No. 07/100,323, filed Sept. 23, 1989 now abandoned.

BACKGROUND OF THE INVENTION

1. Field of the Invention

This invention relates to a cordless telephone apparatus and more particularly to a cordless telephone apparatus in which a connection device generates a call or ringer tone when there is an incoming call from a subscriber's line during power stoppage.

2. Description of the Related Art

FIG. 5 schematically illustrates a cordless telephone apparatus.

In FIG. 5, a subscriber's line 1 is connected to a connection device 2 which is supplied with power from a commercially available power source 5. A cordless telephone 3 is connected to the connection device 2 via a radio circuit. A main telephone 4 is connected in parallel with the connection device 2. If there is an incoming call signal on the subscriber's line 1 from a telephone office, the connection device 2 detects it and connects the telephone 3 and the connection 2 via the radio circuit to thereby cause the telephone 3 to generate a ringer tone. When the connection device 2 is not connected with the telephone 3 via the radio circuit, however, the telephone 3 does not generate a ringer tone.

One could conceive a structure of the connection device 2 as shown in FIG. 6 in which if the connection device 2 is not connected with the telephone 3, a speaker 16 of connection device 2 is rung. Namely, in FIG. 6, if there is an incoming call on the subscriber's line 1, this call is detected by a rectifier 13 and a detector 14. The output from the detector 14 causes a control circuit 10 to drive a transmitter 7 and a receiver 9 to thereby establish a radio circuit between the connection device 2 and the telephone 3. This causes the call signal on the subscriber's line 1 to be delivered via a hybrid circuit 6 and a transmitter 7 to a synthesizer 8 from which the signal is carried on a carrier and transmitted via an antenna 11 to the telephone 3. This signal drives a sounder, not shown, of the telephone 3 to cause a ringer tone to be generated. A signal from the telephone 3 is received by an antenna 12 and applied to a receiver 9 whereupon the signal is demodulated by a signal from the synthesizer 8 and transmitted via the hybrid circuit 6 to the subscriber's line 1.

If no radio circuit is established between the connection device 2 and the cordless telephone 3 for some reason although there is an incoming call on the subscriber's line 1, the output of the detector 14 is delivered from the control circuit 10 via an amplifier 15 to a speaker 16 to thereby cause the speaker to produce a ringer tone. The control circuit 10 is driven with power supplied from the power source 5 to control the transmitter 7, synthesizer 8, receiver 9 and amplifier 15.

If no radio circuit is established between the connection device 2 and the telephone 3 although there is an incoming call on the subscriber's line 1, and a ringer tone is produced from the speaker 16 of the connection device 2, the main telephone 4, branching from the subscriber's line 1, responds to the incoming call. Therefore, in this case, the main telephone 4 is set in advance so that no ringer tone rings therein.

If the power source 5 stops supplying power in the conventional telephone apparatus, the control circuit 10 of the connection device 2 does not work. Under this condition, although there is an incoming call on the subscriber's line 1, no radio circuit is established between the connection device 2 and the telephone 3 because the control circuit 10 does not work, so that the telephone 3 does not produce a ringer tone. Since the control circuit does not work, it cannot deliver a signal to the amplifier 15, so that the connection device 2 does not produce a ringer tone either. Since the main telephone 4 is set in advance so that no ringer tone rings, the main telephone 4 does not produce a ringer tone either. Eventually, although there is an incoming call on the subscriber's line 1, none of the connection device 2, cordless telephone 3 and main telephone 4 produces a ringer tone. Namely, although there is an incoming call during power stoppage, it cannot be noticed at all.

One could conceive a structure in which the main telephone 4 is released from its non-ringing state so as to produce a ringer tone. In this case, however, both the telephones 3 and 4 produce a ringer tone, which is not desirable.

SUMMARY OF THE INVENTION

It is therefore an object of this invention to provide a cordless telephone apparatus which solves the above problems and is capable of producing a ringer tone from the connection device during power interruption.

This invention is characterized by a ringer circuit driven with power supplied from a subscriber's line, and control means for rendering the ringer circuit operative in at least one of the two cases in which the connection device and the cordless telephone are not connected via a radio circuit in response to an incoming call from the subscriber's line and in which the commercially available power source stops suppling power.

According to this invention, there is provided a ringer circuit driven with power supplied from a subscriber's line, and control means for rendering the ringer circuit operative to produce a ringer tone in the two cases in which the connection device and the cordless telephone are not connected via a radio circuit in response to an incoming call from the subscriber's line and in which the commercially available power source stops power suppling.

According to this invention, when there is an incoming call on the subscriber's line and when the commercially available power source stops supplying power, the connection device can produce a ringer tone to thereby report the presence of the incoming call reliably. The circuit which produces a ringer tone during power interruption is also used as a circuit which produces a ringer tone when the connection device and cordless telephone are not connected by the radio circuit during the supply of power, so that the cost is not increased substantially.

DESCRIPTION OF THE PREFERRED EMBODIMENT

Figure 1:
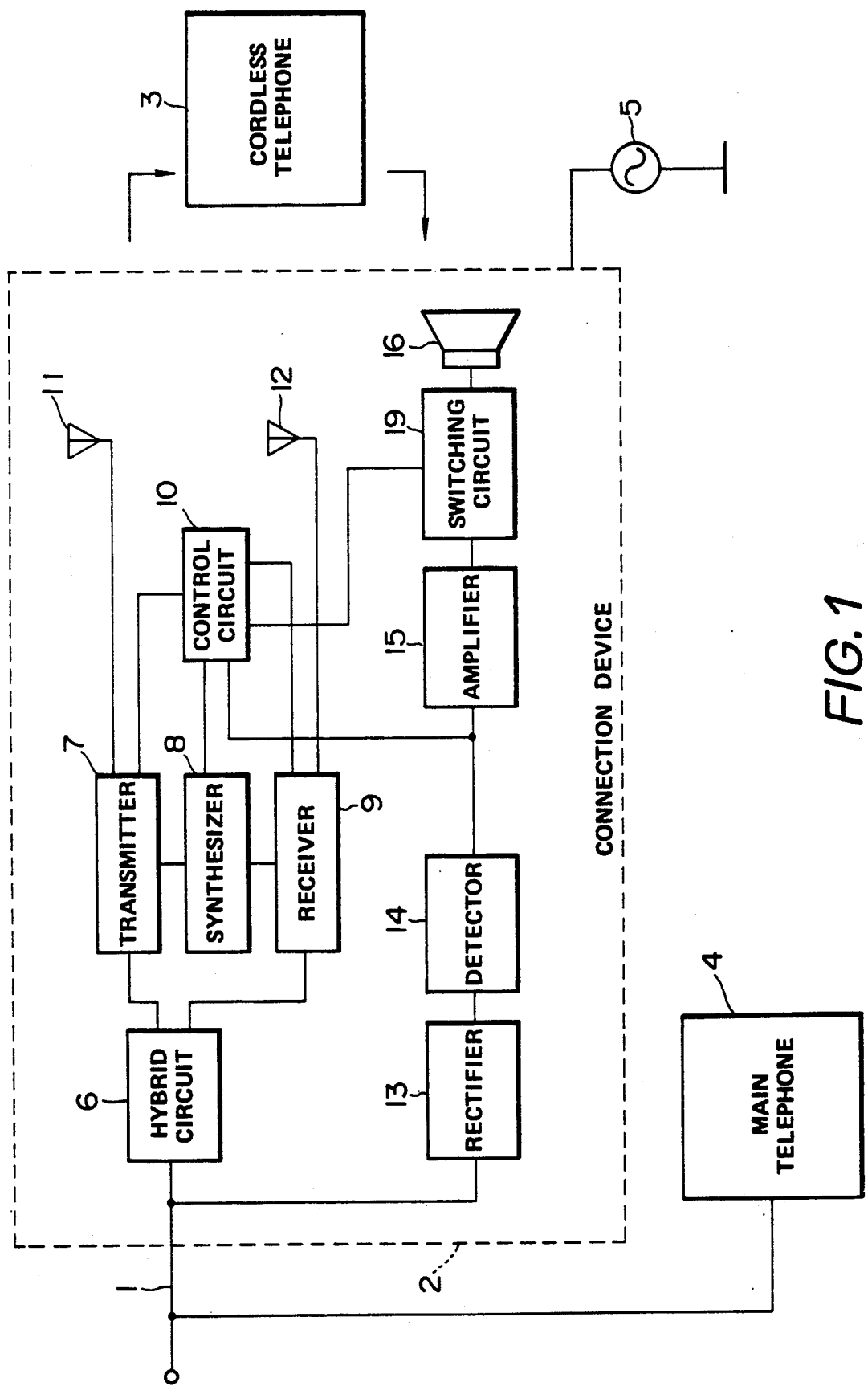
FIG. 1 is a schematic drawing showing one embodiment of a cordless telephone apparatus according to this invention.

FIG. 1 is a schematic drawing showing one embodiment of a cordless telephone apparatus according to this invention. For convenience of explanation, like reference numerals are used to denote like functional elements or parts of the devices shown in FIGS. 1 and 6 in which FIG. 6 concerns the conventional apparatus as mentioned above.

Figure 6:
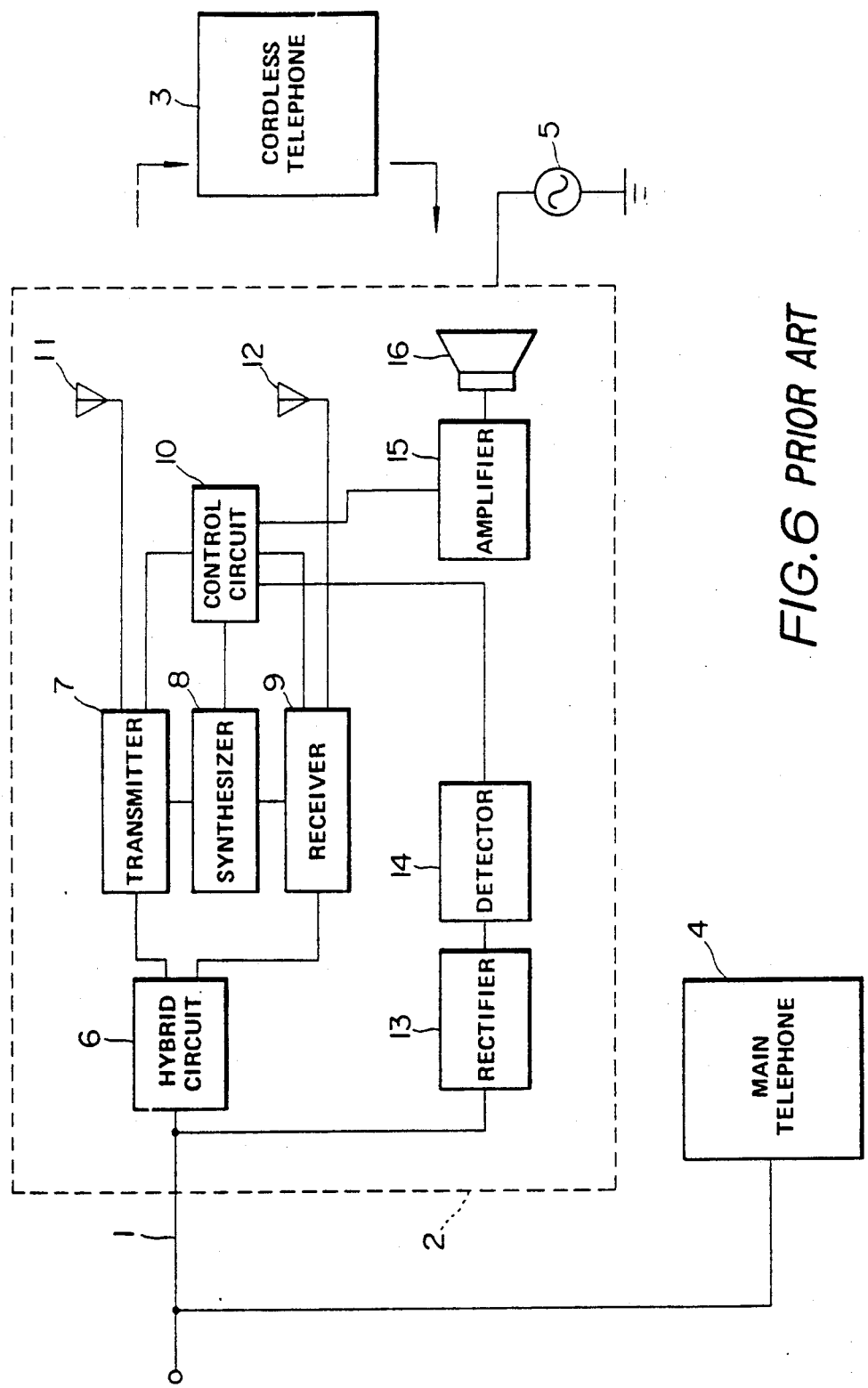
FIG. 6 is a schematic drawing showing a conventional cordless telephone apparatus.

The embodiment shown in FIG. 1 includes a modification of the apparatus of FIG. 6 obtained by applying the detection output from the detector 14 directly to the speaker 16 via the amplifier 15 and providing a switching circuit 19 which controls the operation of the speaker 16 between the amplifier 15 and speaker 16.

Figure 2:
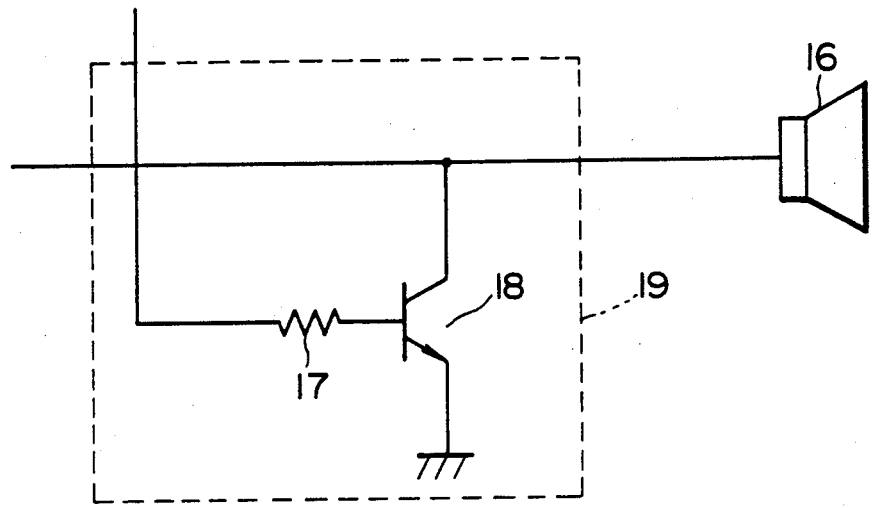
FIG. 2 is a circuit diagram showing an example of the structure of a switching circuit.

The switching circuit 19 is composed of a transistor 18 and a resistor 17, as shown in FIG. 2. When a control signal from the control circuit 10 is low, the transistor 18 is turned off to thereby render the speaker 16 operative. When the control signal is high, the transistor 18 is turned on to thereby ground the circuit from the amplifier 15 to the speaker 16, thus rendering the speaker 16 inoperative. The control means, as embodied and described herein, includes the control circuit 10 and the switching circuit 19.

In the arrangement of FIG. 1, the rectifier 13, detector 14 and amplifier 15 operate only with power supplied from the subscriber's line 1 and are not influenced even when the power source 5 stops power supply.

The embodiment of FIG. 1 will now be described.

When the commercially available power supply 5 supplies power to the connection device 2, and when there is an incoming call on the subscriber's line 1, this call is detected by the rectifier 13 and the detector 14. This causes the control circuit 10 to control the synthesizer 8, transmitter 7 and receiver 9 to thereby establish a radio circuit between the connection device 2 and the cordless telephone 3. Thereafter, the call signal from the subscriber's line 1 is delivered via the hybrid circuit 6, transmitter 7 and antenna 11 to the cordless telephone 3.

This causes the telephone 3 to produce a ringer tone. If the receiver of the telephone 3 is unhooked in response to the ringer tone, a signal indicative of this unhooking is delivered via the antenna 12, receiver 9 and hybrid circuit 6 to the subscriber's line 1 to thereby permit telephonic communication over the telephone 3. Here, the control signal delivered from the control circuit 10 to the switching circuit 19 is at a high level, so that the transistor 18 of the switching circuit 19 shown in FIG. 2 is on to thereby render speaker 16 inoperative. In other words, although a signal to ring the speaker via the rectifier 13, detector 14 and amplifier 15 is created, no ringer tone is produced from the speaker 16.

If no radio circuit is established between the connection device 2 and the cordless telephone 3 although there is an incoming call on the subscriber's line 1, the control circuit 10 changes to low its control signal applied to the switching circuit 19. This causes the transistor 18 of the switching circuit 19 shown in FIG. 2 to be turned off thereby to render the speaker 16 operative.

Therefore, the speaker 16 produces a ringer tone in accordance with a signal applied from the subscriber's line 1 via the rectifier 13, detector 14 and amplifier 15. If no radio circuit is established between the connection device 2 and the telephone 3 for some reason, the speaker 16 of the connection device 2 produces a ringer tone. In this case, this ringer tone is responded to, for example, by the main telephone 4.

If there is an incoming call on the subscriber's line 1 when the commercial power source 5 stops supplying power, the control circuit 10 cannot operate because the commercial power source 5 stops supplying power. Therefore, the synthesizer 8, transmitter 7 and receiver 9 cannot be controlled, so that no radio circuit can be established between the connection device 2 and the telephone 3.

Therefore, the telephone 3 does not produce a ringer tone.

On the other hand, since the control circuit 10 does not work, the control signal applied from the control circuit 10 to the switching circuit 19 becomes low, which turns off the transistor 18 of the switching circuit 19 shown in FIG. 2 to thereby render the speaker 16 operative.

Therefore, in response to a signal applied from the subscriber's line 1 via the rectifier 13, detector 14 and amplifier 15, the speaker 16 produces a ringer tone. As just described above, if there is an incoming call on the subscriber's line 1 when the power source 5 stops supplying power, the speaker 16 of the connection device 2 produces a ringer tone. In this case, this tone is responded to by the main telephone 4.

Figure 3:
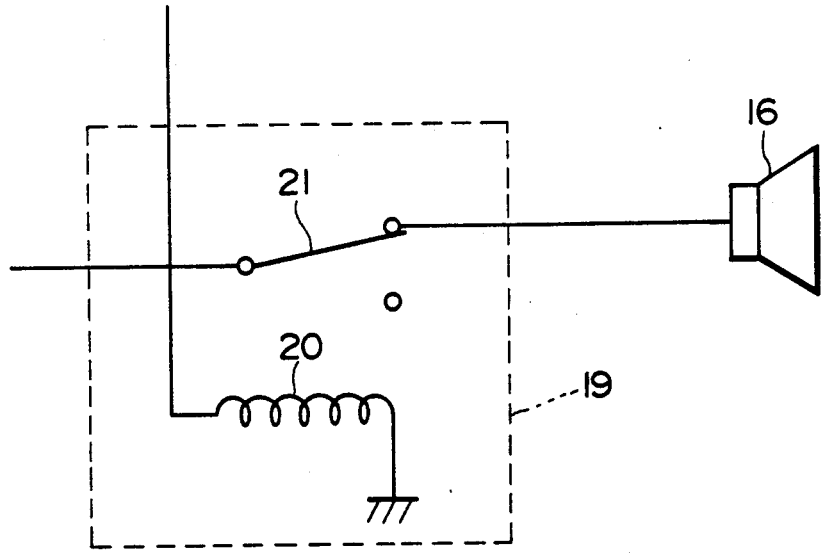
FIG. 3 is a circuit diagram showing an example of another structure of the switching circuit.

FIG. 3 shows another example of the structure of the switching circuit 19. In FIG. 3, the switching circuit 19 includes a relay coil 20 and an automatic returning type relay contact 21. If the connection device 2 and the cordless telephone 3 are connected via a radio circuit in response to an incoming call from the subscriber's line 1, and the control signal from the control circuit 10 becomes high, the relay coil 20 is energized, so that the contact 21 is changed over to a position opposite to that shown, namely, in the sense in which the speaker 16 is rendered inoperative. If the connection device 2 and the telephone 3 are not connected via a radio circuit in response to the incoming call from the subscriber's line 1, and the power source stops supplying power and the control signal from the control circuit 10 becomes low, the relay coil 20 is deenergized to thereby return the contact 21 to the position shown, namely, in the sense in which the speaker 16 is rendered operative, by means of a mechanical force exerted by a spring or the like.

In the arrangement of FIG. 1, the main telephone 4 may be removed. In this case, an incoming call can be ascertained during power stoppage, but the incoming call cannot be responded to.

Figure 4:
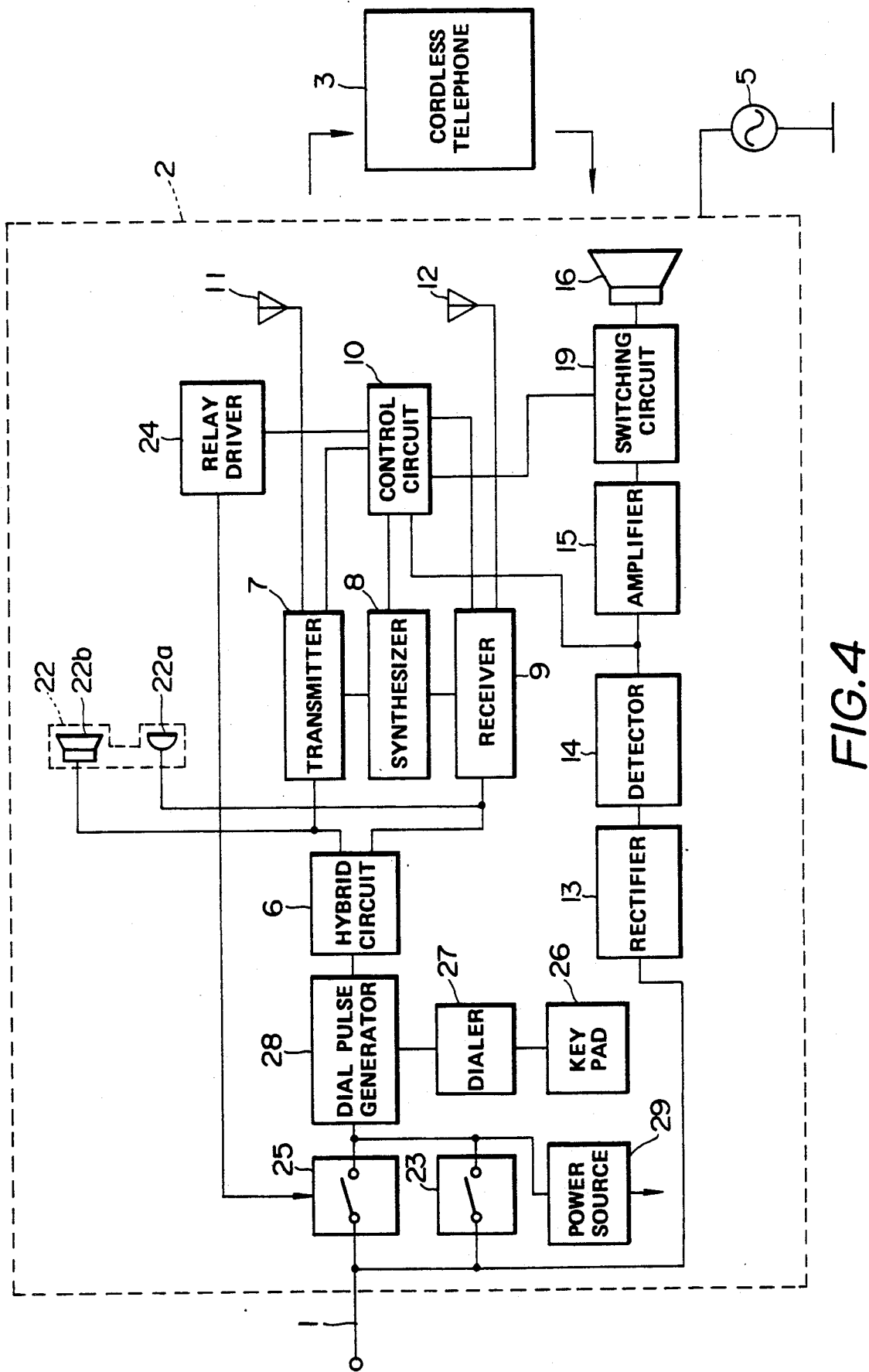
FIG. 4 is a schematic drawing showing another embodiment of a cordless telephone apparatus according to this invention.
Figure 5:
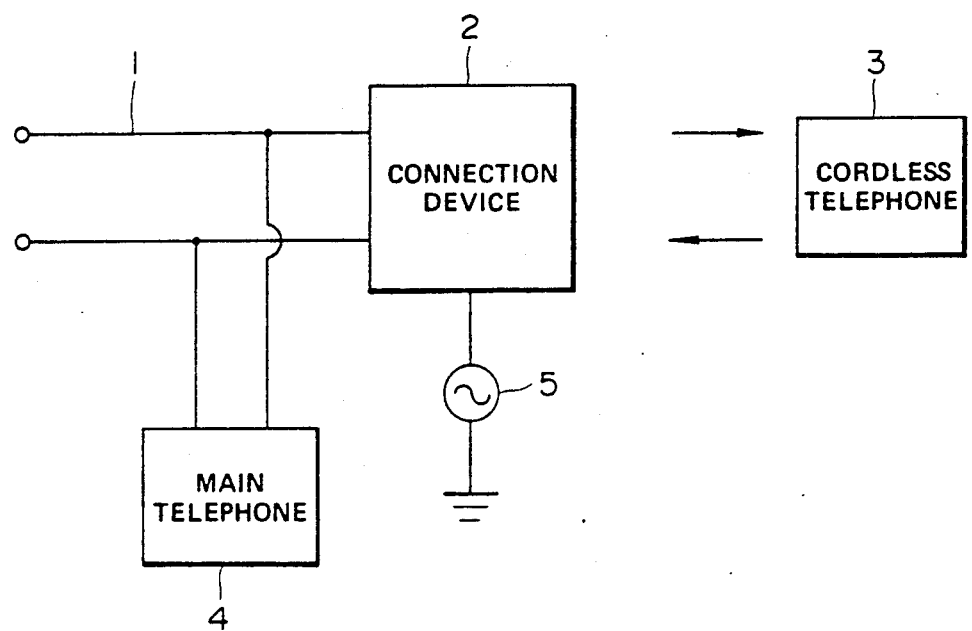
FIG. 5 is a schematic view of the cordless telephone apparatus.

FIG. 4 shows another embodiment in which the connection device 2 has a function to perform telephonic communication even during power stoppage. Compared to the embodiment of FIG. 1, the embodiment of FIG. 4 includes a handset comprising a telephone transmitter 22a and a telephone receiver 22b, a hook switch 23 turned on in response to the unhooking operation of the handset 22, a relay driver 24 controlled by the control circuit 10, a line relay 25 driven by the relay driver 24, a key pad 26, a dialer 27 operated by pressing the key pad 26, a dial pulse generator 28 controlled by the dialer 27, and a power supply 29 which becomes operative by electric power supplied from the subscriber's line 1, forming a power source for the dialer 27 and the hybrid circuit 6. The handset 22 operates in cooperation with the hook switch 23 and the above described components in a manner similar to a conventional corded telephone.

In this embodiment, when the power source 5 supplies power to the connection device 2, a signal from the control circuit 10 drives the relay driver 24 to thereby turn on the line relay 25. The operation of this embodiment at this time is similar to that of the embodiment of FIG. 1.

When the power source 5 stops supplying power due to external power stoppage, the relay driver 24 is rendered inoperative to thereby turn off the line relay 25. Under this condition, if there is an incoming call on the subscriber's line 1, the speaker 16 produces a ringer tone in accordance with a signal applied from the subscriber's line 1 via the rectifier 13, detector 14 and amplifier 15. Here, when the handset 22 is unhooked, the hook switch 23 is turned on to thereby cause the power source 29 to render the hybrid circuit 6 operative. Thus, telephonic communication is possible using the handset 22 by means of the circuit including the subscriber's line 1, hook switch 23, dial pulse generator 28, hybrid circuit 6 and handset 22.

In this embodiment, if the handset 22 is unhooked, it is possible to perform telephonic communications irrespective of whether or not the power source 5 is off. For example, if the handset 22 is unhooked and the key pad 26 is pressed, the dialer 27 will drive the dial pulse generator 28 to thereby send a call. If the handset 22 is unhooked during communication over the telephone 3, a meeting state will be brought about, so that it is possible to participate in telephonic communication over the telephone 3.

What is claimed is:

1. A cordless telephone apparatus comprising:
a cordless telephone; and
a connection device connected to a subscriber's line and connectable to said cordless telephone via a radio circuit, said connection device being driven by a power source and including:
a ringer circuit driven with power supplied from the subscriber's line; and
control means for automatically rendering the ringer circuit inoperative when the connection device and the cordless telephone are connected via the radio circuit such that the cordless telephone produces an audible ringing signal in response to an incoming call from the subscriber's line and for automatically rendering the ringer circuit operative if either one of a first condition and a second condition are satisfied; the first condition being that the connection device and the cordless telephone are not connected via the radio circuit such that the cordless telephone is not capable of producing an audible ringing signal in response to an incoming call from the subscriber's line and the second condition being that power supplied from the power source is interrupted.

2. A cordless telephone apparatus according to claim 1, wherein
the control means includes a circuit for connecting to ground an input signal to a speaker of the ringer circuit via switching means, and
the switching means is switched off if either one of said first condition and said second condition is satisfied.

3. A cordless telephone apparatus according to claim 2, wherein
the switching means includes a transistor having a collector connected to an input to a speaker of the ringer circuit, an emitter grounded, and a base; and a signal applied to the base of the transistor becomes low if at least one of said first condition and said second condition is satisfied.

4. A cordless telephone apparatus according to claim 1, wherein the control means includes a self-returning relay circuit responsive to a signal representing a predetermined value applied thereto for interrupting the connection between the subscriber's line and a speaker of the ringer circuit and responsive to a signal representing a value different from said predetermined value for connecting the subscriber's line to the speaker of the ringer circuit, and the signal applied to the self-returning relay circuit is said signal representing a value different from said predetermined value if at least one of said first condition and said second condition is satisfied.

5. A cordless telephone apparatus comprising:
a cordless telephone; and
a connection device connected to a subscriber's line and connectable to said cordless telephone via a radio circuit, said connection device being driven by a power supply and including:
a ringer circuit driven with power supplied from the subscriber's line; and
control means for automatically rendering the ringer circuit operative only if the connection device and the cordless telephone are not connected via the radio circuit such that the cordless telephone is not capable of producing an audible ringing signal in response to an incoming call from the subscriber's line and if the power supply is interrupted.

* * * * *